(12) United States Patent
Katzmann

(10) Patent No.: US 11,133,168 B2
(45) Date of Patent: Sep. 28, 2021

(54) METHOD FOR SPECTROMETRY

(71) Applicant: University of Basel, Basel (CH)

(72) Inventor: Gregory Katzmann, Lindau (DE)

(73) Assignee: UNIVERSITY OF BASEL, Basel (CH)

( * ) Notice: Subject to any disclaimer, the term of this patent is extended or adjusted under 35 U.S.C. 154(b) by 0 days.

(21) Appl. No.: 16/345,361

(22) PCT Filed: Oct. 26, 2017

(86) PCT No.: PCT/EP2017/077437
§ 371 (c)(1),
(2) Date: Jun. 26, 2019

(87) PCT Pub. No.: WO2018/078013
PCT Pub. Date: May 3, 2018

(65) Prior Publication Data
US 2019/0318920 A1 Oct. 17, 2019

(30) Foreign Application Priority Data
Oct. 26, 2016 (EP) ..................................... 16195770

(51) Int. Cl.
*H01J 49/04* (2006.01)
*H01J 49/10* (2006.01)
(Continued)

(52) U.S. Cl.
CPC .......... *H01J 49/102* (2013.01); *G01N 21/714* (2013.01); *H01J 49/0409* (2013.01);
(Continued)

(58) Field of Classification Search
CPC .. G01N 21/714; H01J 49/0409; H01J 49/049; H01J 49/105; H01J 49/10; H05H 1/46; H05H 1/24
See application file for complete search history.

(56) References Cited

U.S. PATENT DOCUMENTS

| | | | | |
|---|---|---|---|---|
| 5,081,397 | A | * | 1/1992 | Liang ....................... H05H 1/46 250/425 |
| 2002/0113144 | A1 | * | 8/2002 | Huang .................... B05B 7/066 239/424.5 |

(Continued)

FOREIGN PATENT DOCUMENTS

| | | |
|---|---|---|
| CN | 104810234 | 7/2015 |
| CN | 105931942 | 9/2016 |

(Continued)

OTHER PUBLICATIONS

Werner, Klaus. "What is Solid-State RF Energy." Altenergymag. com, Mar. 22, 2016 (Year: 2016).*

(Continued)

*Primary Examiner* — Wyatt A Stoffa
(74) *Attorney, Agent, or Firm* — JMB Davis Ben-David

(57) ABSTRACT

The invention relates to a method for the spectrometry, in particular mass spectrometry, ion-mobility spectrometry, or optical emission spectroscopy, of a sample, comprising the following steps: providing a solid-state generator for generating a high-frequency signal, having a control element for varying the power and/or frequency of the signal, providing a plasma ignition head fed by the signal for generating a plasma jet, applying the plasma jet to a sample, performing a first measuring operation, wherein the plasma jet is generated with a first power of the solid-state generator and a spectrum emitted by the sample, preferably charged ions and/or optical spectrum, is recorded by means of a spectrometer, wherein the first power leads to a soft ionization of the sample, and performing a second measuring operation on the same sample, wherein the plasma jet is generated with a second power of the solid-state generator and a spectrum emitted by the sample, preferably charged atoms and/or optical spectrum, is recorded by means of the spectrometer, (Continued)

Figure 1:
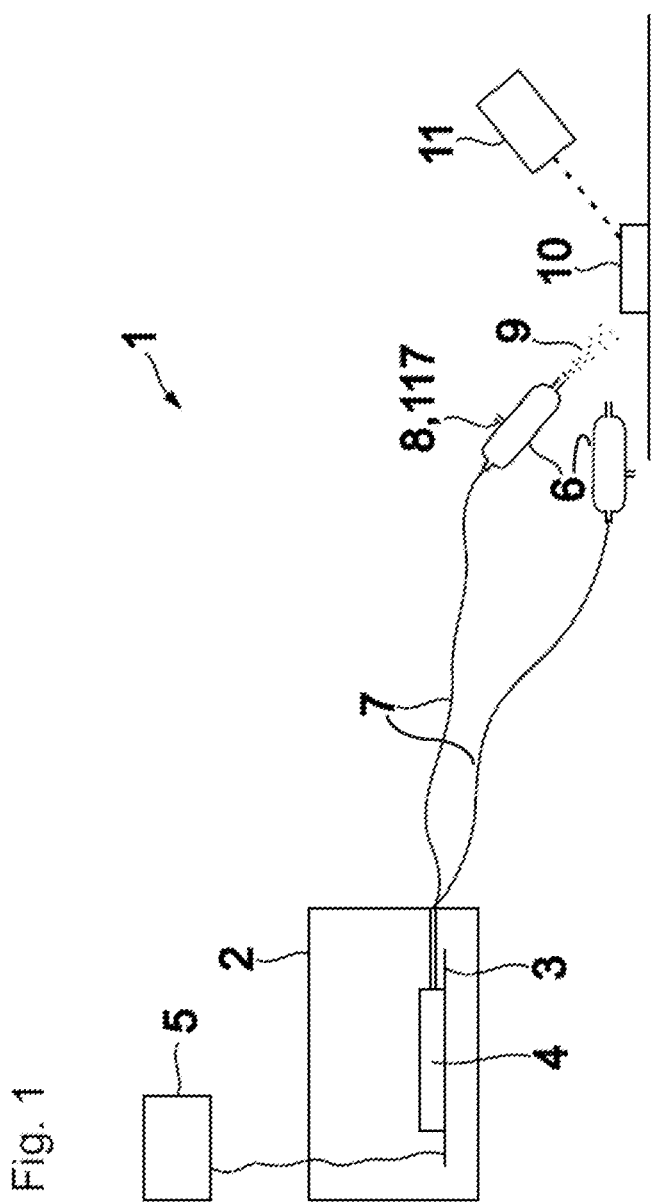

wherein the second power leads to a hard ionization of the sample.

17 Claims, 5 Drawing Sheets

(51) Int. Cl.
    *G01N 21/71*     (2006.01)
    *H05H 1/46*     (2006.01)

(52) U.S. Cl.
    CPC .......... *H01J 49/049* (2013.01); *H01J 49/105* (2013.01); *H05H 1/46* (2013.01)

(56) References Cited

U.S. PATENT DOCUMENTS

| | | | | |
|---|---|---|---|---|
| 2005/0078309 | A1* | 4/2005 | Hammer | H05H 1/30 |
| | | | | 356/316 |
| 2010/0258717 | A1* | 10/2010 | Chen | H01J 49/0431 |
| | | | | 250/288 |
| 2011/0168881 | A1* | 7/2011 | Sturgeon | H01J 49/142 |
| | | | | 250/282 |
| 2013/0015766 | A1* | 1/2013 | Taghioskoui | H05H 1/46 |
| | | | | 315/111.41 |
| 2014/0066838 | A1* | 3/2014 | Hancock | A61N 5/022 |
| | | | | 604/23 |
| 2015/0085280 | A1* | 3/2015 | Morrisroe | H01J 49/105 |
| | | | | 356/316 |
| 2015/0255262 | A1* | 9/2015 | Murtazin | G01N 21/73 |
| | | | | 356/316 |
| 2015/0262804 | A1* | 9/2015 | Martinez Jarquin | |
| | | | | H05H 1/2406 |
| | | | | 250/288 |
| 2016/0111269 | A1 | 4/2016 | Aliman et al. | |
| 2016/0254133 | A1* | 9/2016 | Lopez-Avila | H01J 49/049 |
| | | | | 250/282 |
| 2018/0053644 | A1* | 2/2018 | Jones | A61F 13/38 |
| 2018/0366309 | A1* | 12/2018 | Berkout | H01J 49/0027 |
| 2019/0371589 | A1* | 12/2019 | Takats | A61B 10/0283 |

FOREIGN PATENT DOCUMENTS

| | | |
|---|---|---|
| CN | 105957793 | 9/2016 |
| DE | 102013213501 | 1/2015 |
| EP | 3062331 | 8/2016 |
| JP | 2001108656 | 4/2001 |

OTHER PUBLICATIONS

Klute, Felix David, et al. "Capillary dielectric barrier discharge: transition from soft ionization to dissociative plasma." Analytical chemistry88.9 (2016): 4701-4705 (Year: 2016).*

Kraus, W., et al. "Solid state generator for powerful radio frequency ion sources in neutral beam injection systems."Fusion Engineering and Design91 (2015): 16-20 (Year: 2015).*

Ding et al"Plasma-based ambient mass spectrometry techniques: The current status and future prospective" Mass Spectrometry Reviews vol. 34, Issue4 Jul./Aug. 2015 pp. 449-473.

Portoles et al"Use of soft and hard ionization techniques for elucidation of unknown compounds by gas chromatography/time-of-flight mass spectrometry" Rapid Commun. Mass Spectrom. 2011, 25, 1589-1599.

Zhan et al"Microwave-Induced Plasma Desorption/Ionization Source for Ambient Mass Spectrometry " Anal. Chem. 2013, 85, 9,4512-4519 Publication Date: Mar. 28, 2013.

Zhao et al"A systematic study of the distinctive character of microwave induced plasma desorption/ionization (MIPDI) mass spectrometry: Is it a soft or a hard ion source? "International Journal of Mass Spectrometry vol. 376 Jan. 15, 2015, pp. 65-74.

* cited by examiner

METHOD FOR SPECTROMETRY

The invention relates to a method for the spectrometry, in particular mass spectrometry, ion-mobility spectrometry, or optical emission spectroscopy, of a sample. The invention further relates to a spectrometry device.

In the methods of spectrometry or spectroscopy described herein, an ion jet is applied to the sample. The resulting spectrum, in particular the ions emanating from the sample, are recorded and analyzed with a corresponding spectrometer. A previously known method is shown in EP 306 233 1 A. Elements are detected by means of inductively coupled plasma with optical or mass-sensitive detection, ICP-MS and ICP-OES. The elements with atomic masses from 7 u to 250 u are detected. Molecules, in particular organic molecules, proteins, and biopolymers are detected with the following ionization methods: ESI, APCI, MALDI, DART, DAPCI, DESI, LAESI, LTP, and photoionization.

The problem addressed by the invention is that of providing a method for spectrometry which can be executed with the least possible effort on a wide variety of samples containing molecules and elements or mixtures thereof, and which allows for the best possible results with very short analysis times for the analysis of the sample. It is thus possible with a device to determine molecules, e.g., small organic molecules of up to 5000 u, and the elements of the PTE, e.g., of the alkali metals, metals, alkaline earth metals, transition metals, semimetals, nonmetals, actinoids, lanthanides.

This problem is solved by the features of the independent claims. Advantageous embodiments of the invention are the subject matter of the dependent claims.

The problem is thus solved by a method for the spectrometry, in particular mass spectrometry, ion-mobility spectrometry, or optical emission spectroscopy, of a sample, comprising the following steps:

Providing a solid-state generator, semiconductor-operated generator and/or semiconductor generator, also referred to or called a microwave generator, for generating a high-frequency signal, having a control element for varying the power and/or frequency of the signal. Preferably, the frequency can be varied with a corresponding control element.

Providing a plasma ignition head fed by the signal for generating a plasma jet, and applying the plasma jet to the sample. The application of the plasma jet to the sample is optionally effected by an alternative or additional introduction of the sample into the plasma jet, or by gathering the sample by or into the plasma jet, in particular via an inner conductor of a sample feed in the manner of a cannula plasma jet.

Performing a first measuring operation on the sample, wherein the plasma jet is generated with a first power of the solid-state generator, a spectrum emitted by the sample is recorded by means of a spectrometer, and the first power on the solid-state generator is adjusted such that the application of the plasma jet to the sample leads to a desorption and ionization of molecules present in the sample into molecular ions, quasi-molecular ions, molecule adducts and/or fragments.

Performing a second—alternative or additional—measuring operation on the same sample, wherein the plasma jet is generated with a second power of the solid-state generator, which is higher than the first power, in particular in the range of up to 400 W, a spectrum emitted by the sample is recorded by means of the spectrometer, and the second power on the solid-state generator is adjusted such that the application of the plasma jet to the sample leads to a desorption, atomization, and ionization of elements of the periodic table present in the sample.

The spectrum emitted by the sample is or will be specifically formed by material components produced by the sample, for example, ions in the form of singly or multiply charged atoms and/or molecules in the gas phase, and/or by an emitted optical spectrum.

According to the invention, a relevant spectrometer is an optical spectrometer, a mass spectrometer, an ion-mobility spectrometer and/or a combination spectrometer, which covers these or other underlying spectrometric measuring methods and/or detection methods.

For the purpose of the present invention, the solid-state generator can alternatively or additionally also be called a semiconductor-based microwave generator. Therefore, the terms solid-state generator and semiconductor-based microwave generator are above and in the following used synonymously.

According to the invention, a solid-state generator is used to generate the high-frequency signal. This solid-state generator does not generate the high-frequency signal by means of tubes or a magnetron, and is thus different from and not to be confused with these components, but instead uses, for example, transistors or integrated circuits for generating and amplifying the signal.

The energy from a solid-state generator or semiconductor-based microwave generator offers many advantages that can be achieved with other approaches: a low-voltage operation or control, reliability due to the design as a semiconductor component, smaller form factors, and all the advantages which result, also in optical terms, from the solid-state character and the semiconductor character of the underlying electronics (all-solid-state electronics footprint). Particularly outstanding are the aspects in terms of flexibility and mobility with regard to frequency, phase, and power, especially also in the context of a high degree of accuracy. This allows for a quick switching between different measuring phases. This applies particularly also to the high degree of controllability, even at extended parameter ranges, a uniform energy distribution, and a high and fast adaptability under different and changing load conditions. In particular, GaN and LDMOS transistors allow for these advantages.

The signal is transmitted, for example, via a cable, to the plasma ignition head, also referred to as a plasma jet or cannula jet. The "power" described in the context of this invention is generated by the solid-state generator and used in the plasma ignition head for igniting or maintaining the plasma. If relative or absolute variables of the power are indicated, they always refer to the power applied to the input of the plasma ignition head. The technology of the solid-state generator allows for almost any variation of said power.

In this case, the sample, which consists of elements or molecules, can be recorded almost simultaneously on a mass spectrometer and an ion source. In the prior art, two separate devices (e.g., ICP-MS and ion trap, quadrupole, triple quadrupole, time of flight and orbitrap) and two different ionization methods (ICP plasma and ESI/APCI/photoionization) are provided for the analysis of elements and molecules in a sample. Elements are detected with an ICP-MS or ICP-OES which uses an inductively coupled plasma, e.g., in the range of 2 kW, to atomize and ionize the sample. Molecules (organic, peptides, biopolymers) of any kind can be ionized by electrospray ionization (ESI), APCI (atmospheric pressure chemical ionization), or photoionization, and detected with a mass spectrometer.

In the following, a plasma ion source and a method, among others, shall be described which ionize elements and molecules almost simultaneously and which can detect the ions by means of mass spectrometry, by means of optical emission spectroscopy and/or by means of ion-mobility spectroscopy.

Within the scope of the invention, it has been found that the variation of the power can be used to perform both a soft ionization for the molecules, and a hard ionization for the elements of the periodic table of the elements on one and the same sample. The term "soft ionization" refers to the desorbing and ionizing of, e.g., organic molecules with a non-LTE plasma, e.g., with process gas argon, helium, nitrogen, noble gases, and air, e.g., at 50° C. to 600° C. plasma gas temperature. This plasma gas temperature can be generated by means of a semiconductor-operated microwave generator. All possible types, including adducts of charged molecules, which, e.g., are generated by atmospheric chemical ionization, are expected.

The term "hard ionization" refers to the atomization and ionization of elements, particularly of alkali metals, alkaline earth metals, transition metals, metals, semimetals, actinides, lanthanides, nonmetals, halogens, of the periodic table, with a high-temperature plasma, e.g., process gas argon, helium, nitrogen, noble gases and/or air, at 3500° C. to 9000° C. plasma gas temperature. This plasma gas temperature can be generated by means of the semiconductor-operated microwave generator.

In the prior art, the following ionization techniques are used for the generation of molecules: ESI, APCI, MALDI, and photoionization which, by definition, are soft ionization methods. In order to detect elements within the meaning of the periodic table (PTE) of the elements, the ICP-MS or the ICP-OES technique is used in known methods.

According to the invention, two different measurement processes can be performed with two different powers, but with the same solid-state generator, the same plasma ignition head, and on the same sample, which contains molecules and/or elements of the periodic table of the elements, possibly in a complex sample matrix. The powers for the different measuring operations are selected such that the soft ionization takes place first, followed by the hard ionization of the sample. Soft ionization ionizes the molecules in the sample. Mainly molecular ions or quasi-molecular ions (e.g., $[M+H]^+$, $[M]^+$, $[M+OH]^+$, $[M+NH_4]^+$, $[M-H]^-$) are formed (see DART, DESI, LAESI, DAPCI, APCI, and ESI ionization). In case of a hard ionization, the energy supplied via the plasma jet is so high that a desorption, atomization, and ionization of the elements of the periodic table, particularly of the metals and semimetals, of alkali metals and alkaline earth metals, takes place in the sample.

Particularly preferably, the sample is arranged outside the spectrometer while the method is executed. The sample is exposed to the ambient air under normal pressure or is located in a chamber with inert gas, such as nitrogen, argon, or any other noble gas. The plasma jet which is generated by the plasma ignition head or plasma cannula jet is preferably located between the sample and the inlet capillary of the mass spectrometer.

The samples which can be examined with the present method are in particular: Solids, liquids, or gases. In particular, aqueous solutions, pills, powders, complex mixtures with multiple ingredients, surfaces, explosives, anesthetics, pharmaceuticals, chemical warfare agents, food, animal source foods, plants, plant parts, crude extracts, extracts, tablets, active pharmaceutical agents, cells of all types, tissues (animal and human), and environmental toxins are examined.

For the purposes of the present invention, the sample can above and in the following also be referred to as the target.

According to the invention, the target can also comprise a biological tissue or be formed by a biological tissue.

The biological tissue can comprise human tissue or non-human tissue, particularly animal tissue or plant tissue. The biological tissue can comprise a biological in-vivo tissue, a biological ex-vivo tissue and/or a biological in-vitro tissue.

The biological tissue can comprise or be formed by:

(i) adrenal tissue, cecal tissue, bladder tissue, bone, intestinal or visceral tissue, brain tissue, breast tissue, lung tissue, tissue of the vessels and especially of the coronary arteries, tissue from the area of the ears, esophageal tissue, tissues from the area of the eyes, gallbladder tissue, tissue from the genital area, heart tissue, hypothalamic tissue, kidney tissue, colon tissue, intestinal tissue in general, laryngeal tissue, liver tissue, lung tissue, tissue of the lymph nodes, tissue from the area of the mouth and/or nose, tissue of the esophagus, parathyroid and/or thyroid tissue, pituitary tissue, tissue from the area of the prostate, tissue from the rectal and/or anal area, tissue from the area of the salivary glands, tissue from the area of the skeletal muscles, skin tissue, tissue from the area of the small intestine, spinal cord tissue, tissue from the area of the spleen, tissue from the area of the stomach, tissue from the area of the thymus gland, tissue from the area of the trachea, tissue from the area of the urinary bladder and/or the area of the ureter, soft tissue, coherent tissue, connective tissue, peritoneal tissue, blood vessel tissue, adipose tissue, (ii) tumor tissue and/or cancer tissue of stages I, II, III, or IV (iii) metastatic tissue, (iv) tumor tissue and/or cancer tissue from mixed stages, (v) tumor tissue and/or cancer tissue of lower or sub-stages, (vi) healthy or normal tissue, (vii) cancerous or abnormal tissue.

The method according to the invention can further comprise a step of desorbing and ionizing at least one aerosol generated by the plasma jet with high or low plasma gas temperature, a fume component, a component of a vapor of a vacuum chamber of a mass spectrometer and/or an ion-mobility spectrometer, in order the generate a multiplicity of analyte ions.

The method according to the invention can further comprise a step, in which it is achieved that an aerosol generated by the plasma jet with high or low plasma gas temperature, a fume component, or a vapor impinge on a collision surface, which is arranged in a vacuum chamber of the mass spectrometer and/or the ion-mobility spectrometer, and so a multiplicity of analyte ions is generated.

The spectrometer is particularly an ion analyzer, mass spectrometer, ion-mobility spectrometer, or optical spectrometer that can measure the ions and emission of atoms and molecules, and the absorption.

For applying the plasma jet, the sample can be arranged externally to the plasma ignition head and be coated directly with the plasma jet.

For applying the plasma jet to the sample, sample material, which underlies the sample, can alternatively be gathered, externally to the plasma ignition head, by means of a sample feed via a sample holder of a sample feed and released via a sample dispenser of the sample feed into the plasma jet originating from a plasma area of the plasma ignition head.

As the sample feed, a tubular element—preferably comprising or made of a metal, in particular copper, and/or comprising or made of an electrically conductive material—can be used which has an inner wall comprising or made of a material which is chemically and/or thermally inert against acids, bases and/or elevated temperatures, preferably in the range of about 300° C., and/or which comprises particularly metals, alloys, glass, quartz, ceramic and/or borosilicate material.

The sample material underlying the sample can be fed directly or indirectly via a gaseous and/or liquid carrier material through the sample feed to the plasma area of the plasma ignition head, in particular by nebulizing, atomizing, swirling, wherein the sample material contains one or more solid, liquid and/or gaseous components.

The second power is higher than the first power. In particular, the second power is at least 1.5 times, preferably at least 3 times, further preferably at least 5 times that of the first power.

The first power for generating the plasma jet during the first measuring operation lies preferably between 1 W and 70 W, particularly preferably between 5 W and 50 W. Depending on the sample, the soft ionization can be performed in this power range.

The second power for generating the plasma jet during the second measuring operation lies preferably between 30 W and 500 W, preferably between 40 W and 300 W. Depending on the sample, the hard ionization can be performed in this power range at a high plasma gas temperature.

It is preferably provided that the two measuring operations are performed alternately, several times in succession on the same sample. For that purpose, the power is set several times to the first power and the second power. This is achieved particularly by means of a control device with a processing unit. The soft and hard ionization of the molecules can thus be alternately observed in the spectrometer.

In particular, the power is set back and forth alternately and in a pulsed manner between the first power and the second power. This results in a pulsed power signal. Preferably, there is a direct increase from the first power to the second power and/or a reduction from the second power to the first power. The individual measuring operations, i.e., the respective application of the plasma jet of the respective power to the sample, preferably last between a few microseconds and several seconds.

Furthermore, it is preferably provided that the power is continuously increased alternately from the first power to the second power and/or lowered again continuously to the first power. The change between the two powers thus takes place along a ramp. A power change in several small increments is also considered to be "continuous." Also, the continuous power change is preferably performed several times, and so the soft and hard ionization of the molecules can be observed several times alternately in the spectrometer. The power change between the two powers preferably lasts between a few microseconds and several seconds.

The pulsed power change and the continuous power change can also be combined. For example, the power can be increased to the second power in a pulsed manner and reduced to the first power in a continuous manner, or vice versa.

It is preferably provided that at least two rounds, in each case with the first and second measuring operation, are performed within 10 seconds, preferably within 5 seconds.

The high-frequency signal preferably has a frequency between 200 MHz and 5 GHz, particularly preferably between 2.3 GHz and 2.7 GHz, particularly in the ISM band. Tests have shown that an examination of a wide variety of samples is possible particularly in this frequency range. Furthermore, it has been shown that the presented method including the different measuring operations can be performed well in this frequency range.

The two measuring operations described herein are the minimum requirement for examining the sample during the hard and the soft ionization. However, it is preferably also provided that the plasma jet with different power is generated between the two measurements and the plasma jet is applied to the sample accordingly. The imitated spectrum can also be detected with the spectrometer between the two measuring operations, and a corresponding analysis can be performed.

It is preferably provided that the first measuring operation is followed immediately by the second measuring operation. This is possible within the scope of the method presented herein because neither the solid-state generator nor the plasma ignition head have to be changed. The sample also stays in place. "Immediately" means particularly that no more than 10 seconds, preferably no more than 5 seconds, further preferably no more than 1 second, particularly preferably no more than 1 millisecond, lie between the two measurements. More preferably, no more than 100 microseconds, preferably no more than 50 microseconds, lie between the two measurements. As described above, further measurements can be performed between the two measurements, e.g., if the power is continuously increased up to the second power, while the plasma jet is maintained.

After the first measuring operation with the first power, the power of the solid-state generator can be increased gradually and/or continuously up to the second power. In addition, it is also preferably provided that the power is first reduced after the first measuring operation, in particular to zero. Subsequently, the power of the solid-state generator is immediately increased to the second power.

Furthermore, it is preferably provided that there is an increase to the second power when the soft ionization is detected in the spectrometer. This can be achieved particularly by an automated analysis of the recorded spectrum.

Furthermore, it is preferably provided that at least two different plasma ignition heads are provided. The different plasma ignition heads are used for different samples, for example, liquid and solid samples. Before applying the plasma jet to the sample, the plasma ignition head suitable for the sample is connected to the solid-state generator in an electrically conductive manner. Preferably, a solid, powdery, liquid sample, or the aerosol is introduced directly into the plasma through the inner conductor of the plasma ignition head.

In this case, according to the invention, different plasma ignition heads can be provided, for example, a plasma ignition head with an inner conductor and a plasma ignition head without an inner conductor.

In case of the plasma ignition head without an inner conductor, the sample is positioned in front of the plasma ignition head, exposed to the plasma jet and measured.

In case of the plasma ignition head with an inner conductor, the sample is introduced by the inner conductor into the plasma. In this context, it is essential that the plasma ignition head with an inner conductor (e.g., a copper tube with a maximum diameter of 20 mm, preferably 3 mm in diameter) is formed using an inert material, e.g., the interior thereof coated therewith, for example, in view of being affected by acids, bases and/or temperature. The coating can be a chemical inert material, such as metallic alloys, metals, glass, boron glass, ceramic, or the like.

The invention further comprises an ionization and/or spectrometry device. Said device is preferably designed to execute the method described. The ionization and/or spectrometry device comprises the solid-state generator for generating the high-frequency signal. The solid-state generator includes a corresponding control element for varying the power and particularly also the frequency of the signal. Furthermore, the plasma ignition head fed by the signal is provided. The plasma ignition head is designed to generate the plasma jet and to apply said plasma jet to the sample. In addition, a control device is provided. The control device is designed to control the control element in order to generate a plasma jet with at least two different powers. Preferably, the control device can also vary the frequency of the signal. The control device can be integrated in the solid-state generator, or connected to the solid-state generator as an external device.

In particular, the control device is designed as a programmable processing unit. As a result, the required temporal sequence of the power can be stored in the control device.

The control device is preferably designed to perform the two measuring operations alternately, several times in succession on the same sample. For that purpose, the power is set several times to the first power and the second power. In the spectrometer—particularly in the form of a mass spectrometer—charged molecules and charged elements can be observed alternately or optionally.

In an optical spectrometer, the characteristic molecular and atomic bands can be observed.

Furthermore, with an ion-mobility spectrometer, only the charged molecules are observed.

In particular, the power is set back and forth alternately and in a pulsed manner between the first power and the second power by the control device. This results in a pulsed power signal. Preferably, by means of the control device, the first power is directly increased to the second power and/or the second power is directly reduced to the first power. The individual measuring operations, i.e., the respective application of the plasma jet of the corresponding power to the sample, preferably last between a few microseconds and several seconds.

Furthermore, it is preferably provided that the power is alternately increased by means of the control device from the first power to the second power in a continuous manner and/or lowered again continuously to the first power. The change between the two powers thus takes place along a ramp. A power change in several small increments is also considered to be "continuous." Preferably, the continuous power change is also performed several times, and so the soft and hard ionization of the molecules and elements can be observed several times alternately in the spectrometer. The power change between the two powers preferably lasts between a few microseconds and several seconds.

The pulsed power change and the continuous power change can also be combined. The power can be increased by the control device, for example, in a pulsed manner, to the second power and continuously lowered again to the first power, or vice versa.

For both the method according to the invention and in the spectrometry device according to the invention, a plasma ignition head according to the following specification is preferably used:

The plasma ignition head comprises a supply line, an operating unit, and an ignition unit, wherein the operating unit has an electrical length of $\lambda/1$, $\lambda/2$ or $\lambda/4$ ($\lambda$: wavelength) and in the ignited state, the ignition unit has a high-impedance input impedance.

Ignition unit refers to the area of the high-frequency line system, by means of which a high voltage for igniting the plasma is generated at the moment of ignition. Operating unit refers to the part of the high-frequency line system, by means of which the high-frequency signal is coupled into the plasma during operation. Supply line refers to the supply line of the high-frequency signal, before it branches out into the ignition unit and the operating unit. Feed line refers to the part of the high-frequency line system which leads from the divider point between the ignition unit and the operating unit to the impedance transformer. The plasma area is the area, in which the plasma is ignited.

The plasma ignition head with the impedance transformer has the advantage that neither the frequency nor any other variable has to be switched between the ignition and the operation. The plasma ignition head has the advantage that at a fixed frequency, a high voltage can be generated and as soon as a plasma develops, energy can be fed into said plasma in an optimal manner.

Prior to the signal splitting, the characteristic impedance of the supply line in the operating unit and the ignition unit can advantageously be of the order of the plasma base impedance.

The ignition unit can have an electrical length of about $\lambda/4$. Thus, the high-impedance input impedance can be achieved by a $\lambda/4$ transformation.

The impedance transformer can be a single-stage or a multi-stage, particularly a two-stage impedance transformer. As an equivalent circuit, an autotransformer, consisting of a first part and a second part and a so-called gamma transformer, consisting of a third part and the final capacity between the end of the ignition unit and the housing ground, can be used as a two-stage impedance transformer. If a gap is introduced between the feed line and a part of the impedance transformer, similarly to a series capacitor, the result is a further transformation stage in the form of a second gamma transformer at the input from the capacitor and a part of the impedance transformer.

It can further be advantageous if the plasma ignition head has a tubular metallic outer conductor which is arranged coaxially around the ignition unit. In addition to such a coaxial realization form, other embodiments of the high-frequency line system are possible. For example, by means of a waveguide, maximum powers can be used without electrode problems. By means of coplanar lines and particularly striplines, small pressure-tight ignition units can be produced. In case of a coaxial design, the entire interior or a part of the interior can optionally be filled in a pressure-tight manner by means of a dielectric if only one ignition is desired.

The operating unit can be connected to a low-frequency operating source by means of a capacitive insulation. An electrical hybrid plasma is generated from the high-frequency and low-frequency energy portions. As a result, a hybrid plasma with a very high power density can be generated. Even higher energy densities than in the case of the light laser are conceivable.

Preferably, the plasma ignition head comprises one or more gas supply lines and in this configuration is also called a plasma emitter head. A plasma jet is generated by a gas flow flowing through the gas supply line. It must be taken into account that the process gas must not affect the electrodes. As a process gas, particularly with a flow rate of 2000 sccm, preferably 1000 sccm, particularly noble gases, particularly argon-containing gases or ambient air, are possible. Almost all other gases are also usable. However, during the plasma generation of a polluted gas, there are no direct emissions as is the case with a combustion.

Advantageously, the end of the gas line which is open toward the plasma area can have an ellipsoidal cross-section. Particularly preferred is a broad ellipsoidal cross-section.

If the end of the gas line which is open toward the plasma area has a small outlet opening, in particular of the order of about 0.01 mm to 4 mm, in particular from about 0.05 mm to 2 mm, a thin and therefore very powerful plasma jet can be formed which corresponds to the energy density of a laser beam.

It is further advantageous if the end of the gas line which is open toward the plasma area runs in a straight line.

It is particularly advantageous if the end of the gas line which is open toward the plasma area runs parallel to a center axis of the plasma ignition head in the jet direction. This ensures that the plasma jet is emerging in a straight line from the emitter. If the open end of the gas line lies on the center axis, the plasma jet emerges centrally from the emitter.

It is particularly advantageous if the operating unit is designed as a gas supply line. For this purpose, the operating unit is designed as a cannula. This has the advantage that the operating unit is cooled by the gas flow. Due to the cooling, overheating is prevented for an extended period of time. In case of greater powers, it is thus possible to use electrodes that are not made of tungsten. This allows for the use of ambient air as the process gas. In addition, the gas consumption can be reduced. With a corresponding design of the end which is open toward the plasma area by corresponding cross-sectional shaping, i.e., either ellipsoidally or with a small round outlet opening and a corresponding profile, which ensures that the plasma emerges centrally and in a straight line, this design is particularly advantageous.

As already mentioned above, the sample can be placed and measured directly in front of the plasma jet.

Alternatively, with the concept of the cannula jet, which uses an inner conductor with an inert coating, the sample material is introduced and supplied via the inner conductor. In case of the cannula jet, it is possible to introduce the sample as a gas, aerosol, powder, alloy, for example, in the form of solid rods, wires, and liquids through the inner conductor, for example, in the form of a cannula made of a copper tube or other conductive material, particularly metal, with an inert inner surface.

The feed line can also be designed as a gas supply line. In this case, it is also possible to achieve a cooling effect.

Finally, a part of the impedance transformer can be designed as a gas supply line. As a result, a continuous cannula tube consisting of a part of the impedance transformer of the feed line and the operating unit can serve as the sole gas feed. There is no change to the electrical structure.

The plasma jet acts as an antenna. It can therefore be surrounded by a wire netting to avoid interferences. The wire netting is advantageously shorter than the jet in order to ensure that the hottest point in the jet can be used. It is advantageous if the meshes of the netting are smaller than the electrical wavelength.

Preferably, a high voltage for igniting the plasma is generated at a fixed frequency via the ignition unit, and the high-frequency signal is coupled via the parallel-connected operating unit to the plasma area.

Preferably, an argon-containing gas or ambient air is used as the process gas.

Using the drawings, further details, advantages, and features of the present invention will become apparent from the following description of embodiments.

FIG. 1 schematically shows a spectrometry device according to the invention for executing the method according to the invention.

Figure 2:
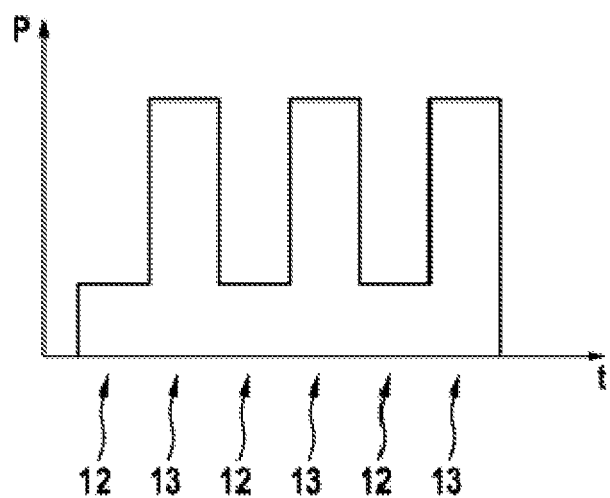
Figure 3:
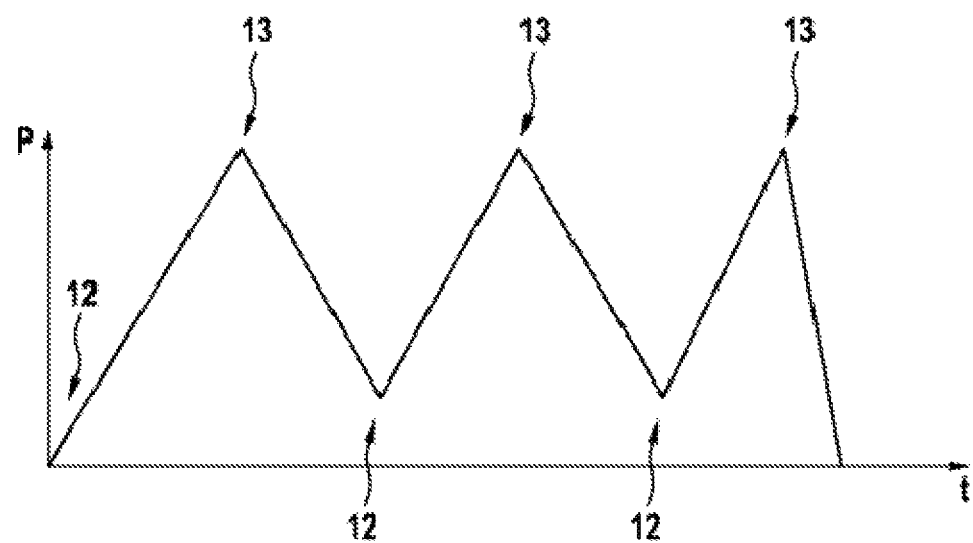

FIGS. 2 and 3 schematically shows different powers plotted over the time.

Figure 4:
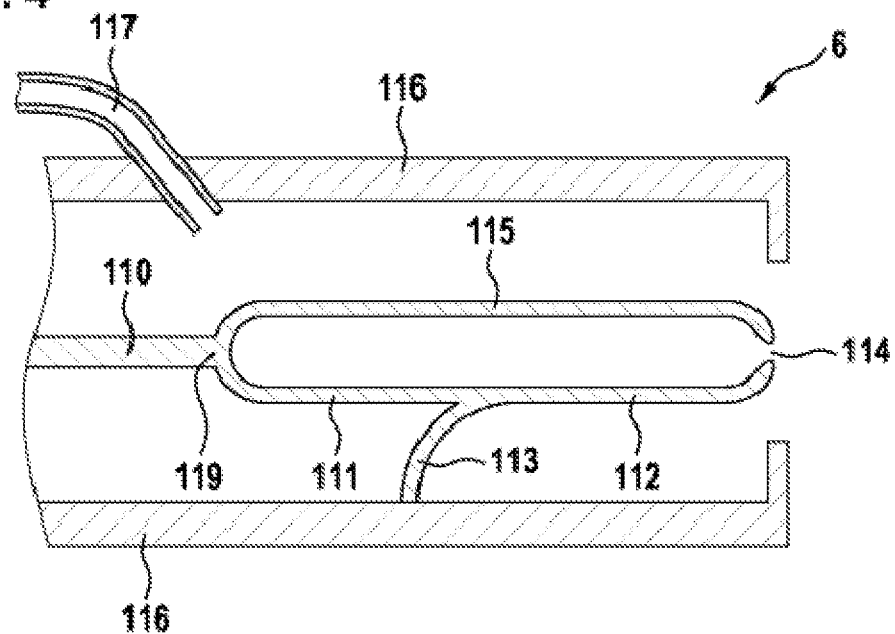

FIG. 4 schematically shows a first advantageous embodiment of the plasma ignition head.

Figure 5:
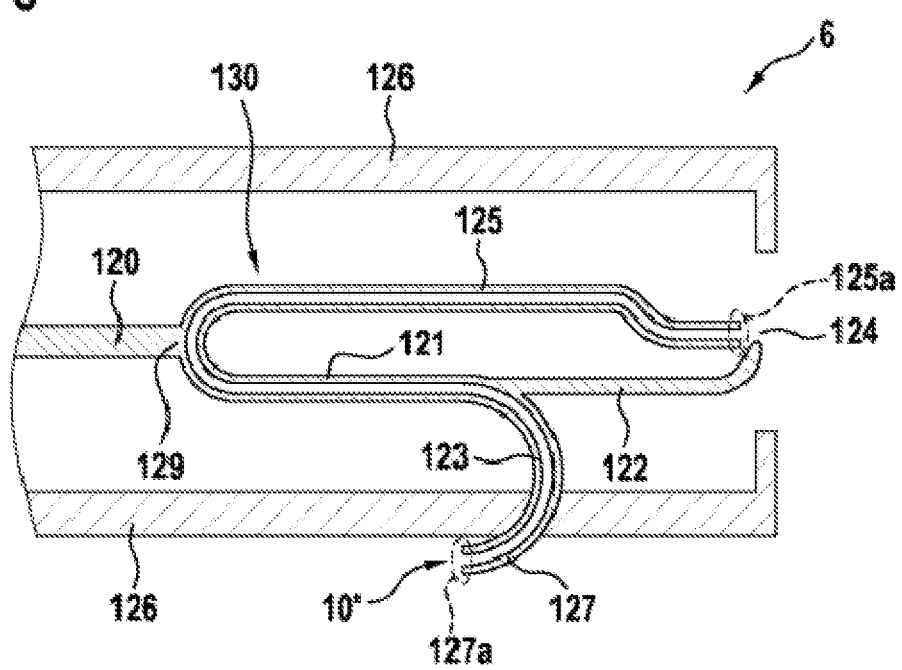

FIG. 5 schematically shows a second advantageous embodiment of the plasma ignition head.

Figure 6:
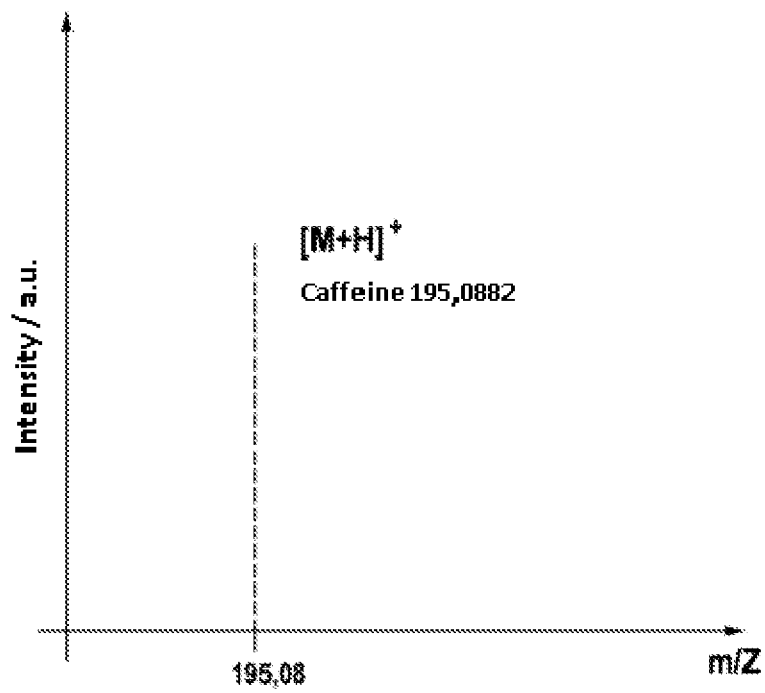
Figure 7:
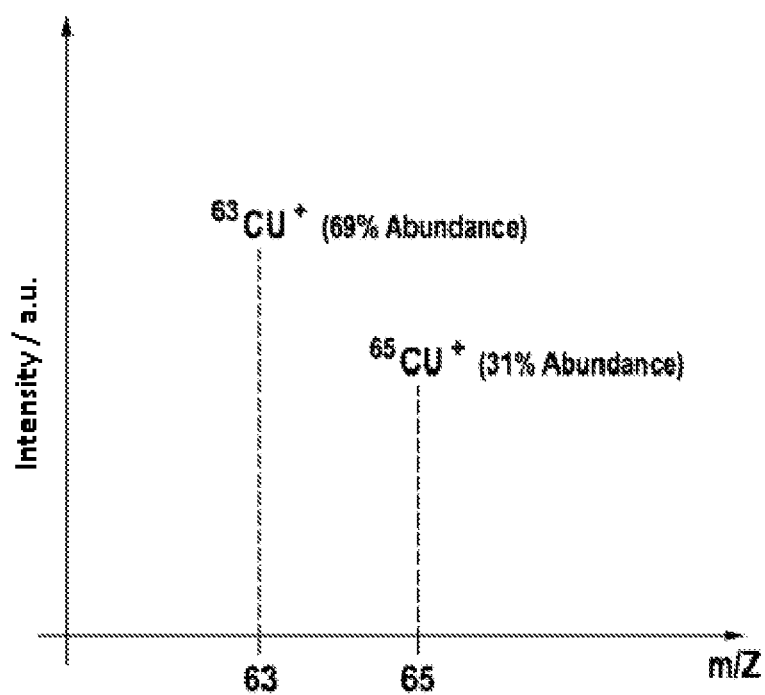
Figure 8:
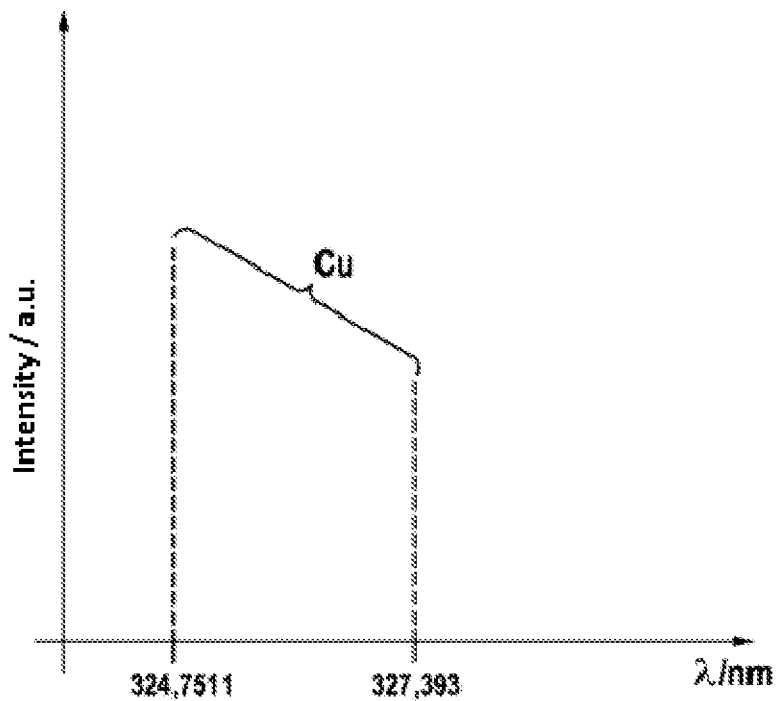

FIGS. 6 to 8 schematically shows spectra of an underlying sample recorded according to the invention.

Figure 9:
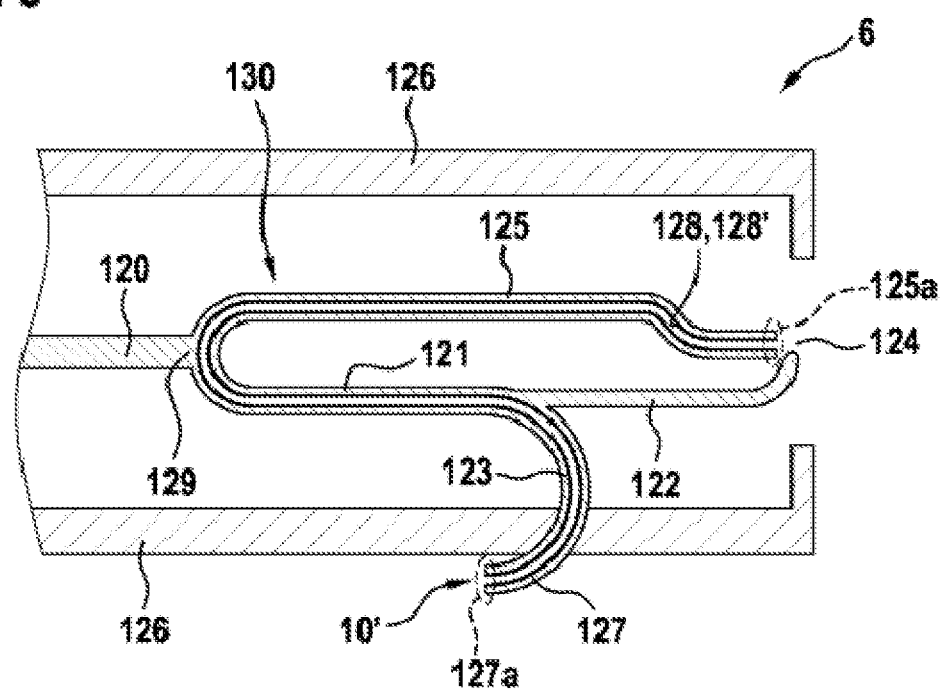

FIG. 9 schematically shows a further embodiment of a plasma ignition head with a sample feed with inner lining.

FIG. 1 shows a spectrometry device 1 designed to execute the method. The spectrometry device 1 comprises a solid-state generator 2. A circuit board 3 is located in the solid-state generator 2. On the circuit board 3, a plurality of solid-state elements 4 (e.g., GaN and/or LDMOS high-frequency transistors) for generating a high-frequency signal is arranged. Furthermore, the solid-state generator 2 comprises a control element, in particular also on the circuit board 3, for changing the power generated by the solid-state generator 2.

Furthermore, a control device 5 is provided which is located either outside or inside the solid-state generator 2 and, via the control element, alternatively also via an external mass flow controller, adjusts the power, the frequency, the gas flow, in particular in the range from 100 sccm to 2000 sccm, of the solid-state generator 2.

The solid-state generator 2 is connected to a plasma ignition head 6 via a cable 7. Via the cable 7, the high-frequency signal is fed with the adjusted power into the plasma ignition head 6. The plasma ignition head 6 particularly has a gas feed 117.

A plasma jet 9 is generated with the plasma ignition head 6, in particular in the region of atmospheric pressure. The plasma jet 9 faces a sample 10. The ions desorbed from the sample 10 are detected by a spectrometer 11.

By means of the control device 5, the plasma jet 9 is distributed successively at two different powers onto the sample 10. At least two measuring operations 12, 13 take place at the different powers. FIGS. 2 and 3 show purely schematically two different courses of the power for performing these two measuring operations 12, 13.

The control device 5 is preferably designed to perform the two measuring operations 12, 13 alternately, several times in succession on the same sample. For this purpose, the power is several times alternately set to the first power and the second power. The soft and hard ionization of the molecules and atoms of the periodic table of the elements, in particular alkali metals, alkaline earth metals, semimetals, and metals, can thus be observed alternately in the spectrometer.

FIG. 2 shows how the power P is set back and forth alternately and in a pulsed manner between the first power and the second power over the time t by the control device 5. This results in a pulsed power signal. Preferably, the power is increased by means of the control device 5 directly from the first power to the second power and reduced from the second power to the first power. The individual measuring operations 12, 13, i.e., the respective application of the plasma jet of the respective power to the sample, preferably last between a few microseconds and several seconds.

Alternatively to the signal curve shown, the power between the measuring operations 12, 13 can also be briefly reduced to approximately 0.

FIG. 3 shows that the power P is alternately increased from the first power to the second power over the time t in a continuous manner by means of the control device 5, and is again lowered continuously to the first power. Here, the change between the two powers takes place along a ramp. The continuous power change is performed several times, and so the soft and hard ionization of the molecules and the atomization and ionization of the elements of the periodic table can be observed several times alternately in the spectrometer. The power change between the two powers preferably lasts between a few microseconds and several seconds.

FIGS. 4 and 5 show advantageous designs of the plasma ignition head 6:

The plasma ignition head 6, designed as an emitter head in FIG. 4, illustrates the basic principle. A circular metallic inner conductor 110 of the coaxial supply line has the characteristic impedance. It is enclosed by a tubular metallic outer conductor 116. An ignition unit consists of inner conductor components, namely a feed line 111, a first part 112 of an impedance transformer, and a second part 113 of the impedance transformer. An operating unit consists of an inner conductor assembly 115.

The inner conductor 115 has an electrical length of 180°, i.e., as long as no plasma was ignited in a plasma area 114, the electrical termination at the point 114 in the form of an open circuit is transformed via the $\lambda/2$ line 115 to the divider point 119 into an open circuit.

Prior to ignition, the upper part 115 is thus considered to be non-existent from an electrical point of view. In the lower area, an impedance transformer, consisting of the first part 112 and the second part 113, is coupled via the feed line 111, which lies in the range of almost 90° of electrical length. As an equivalent circuit, an autotransformer, consisting of the part 113 and a part of 112, and a so-called gamma transformer, consisting of the second part of 112 and the final capacity between 114 and the housing ground 116, can be used as this two-stage impedance transformer.

If a gap is introduced between the feed line 111 and the part 113, similarly to a series capacitor, the result is a further transformation stage in the form of a second gamma transformer at the input from the capacitor and a part of 113.

If a plasma develops via the ignition unit in 114, the plasma impedance is transformed via the $\lambda/2$ line 115 to the divider point 119. Energy can then be coupled into the plasma via said line 115. This energy increases the plasma, which in turn has an electrically lower resistance. Finally, the characteristic impedance of the supply line 110 must correspond to the plasma impedance at the point 114, the so-called plasma base impedance, at full power coupling in order to ensure a power adjustment.

During operation, the ignition unit no longer interferes because line length 111 is optimized such that the electrical length between the divider point 119 and the ground point of the line 113 corresponds to 90° or $\lambda/4$. In other words, the short-circuit of the ground point is transformed via these two conductor segments to an open circuit in the divider point 119.

A gas supply line 117 is used to realize an emitter.

The emitter in FIG. 5 also functions accordingly. In this case, components 120 to 129 have the same function as components 110 to 119 in FIG. 4. However, the previously rod-shaped inner components 111, 113, and 115 have been replaced by tubular components 121, 123, and 125. This does not change anything electrically. However, the tube 123 has been lengthened and, as a cannula tube, it replaces the gas feed 117 which, however, can optionally still be included (not shown).

In this case, the geometry of the operating unit, consisting of the inner conductor stage 125, must be adapted to the desired function: If a narrow plasma jet is desired, a small round opening is preferable, whereas in another case, in which a preferably broad jet is advantageous, a broad elliptical design is preferable.

FIGS. 6 to 8 schematically show spectra of an underlying sample 10 recorded according to the invention.

The spectra shown in FIGS. 6 to 8 must be seen in context with, for example, the depictions of FIGS. 2 and 3 and the first and second measurement phases 12 and 13 described thereto with correspondingly different powers, namely a first measurement phase 12 with a comparatively lower power for generating the plasma jet 9, and a second measuring phase 13 with a comparatively greater power for generating the plasma jet.

FIG. 6 shows a mass spectrum which was recorded in a first measurement phase 12 with comparatively lower power for generating the plasma jet 9 and subsequent spectrometric detection, i.e., with a mass spectrometer 11 as a detection device. The signal intensity in arbitrary units (AU) as a function of the ratio m/Z from mass and charge is shown. A single peak for a species $[M+H]^+$ contained in the sample material 10' and in this case ionized in a protonated manner at an m/Z value of 195.08, which corresponds to caffeine, is shown. During this measuring operation, caffeine was dissolved out, desorbed, ionized, and protonated, and detected as a single peak in the mass spectrometer as a component of the sample material 10' with a comparatively lower power for the plasma jet 9.

In connection with FIG. 7, it is shown that in a second measurement phase 13 with higher energy, correspondingly present elemental copper, namely with the isotope numbers 63 and 65 in the corresponding natural distribution, can be detected in the sample material 10' of the sample 10.

FIG. 9 schematically shows a further embodiment of a plasma ignition head 6 with a sample feed 130, formed by the components or sections 121, 123, 125, 127, with an inner lining 128 comprising or made of an inert material 128', namely as individual peaks at the m/Z values 63 and 65, respectively.

Finally, FIG. 8 shows an alternative or additional analysis in the manner of an optical emission spectrum, in which the relative radiation intensity is shown as a function of the wavelength, and which shows two peaks at about 324.8 nm and 322.4 nm, allowing for an optical detection of the presence of elemental copper of the corresponding isotopes in the sample 10.

Finally, FIG. 9 shows a plasma ignition head 6, in which the sample feed 130, which is formed by the sections 121, 123, 125, 127 of the inner conductor, has an inner wall or inner lining 128, in particular an inner coating, with or made of an inert material 128'. At the feed section 127a, the sample material 10' is introduced into the sample feed 130, dispensed at the outlet 125a on the opposite side, and combined with the plasma in the plasma area 124 by the plasma jet 9 to be applied to the sample 10.

The inner wall 128 can also be formed by an inner tube made of an inert material 128', which is inserted into a tube of the feed 130, for example, the inner conductor 125.

In the following, the invention shall be explained using further embodiments.

(I) EXAMPLES WITH DIRECT PLASMA TREATMENT OF THE SAMPLE AT CONSTANT POWER (1) In a preferred embodiment of the method according to the invention, solid, liquid, gaseous samples 10 are examined with cold non-LTE plasma, particularly up to maximally 600° C. plasma gas temperature for molecules, and with hot LTE plasma, particularly up to about 6500° C. plasma temperature, for example, argon plasma, for elements of the PTE.

For example, the sample 10 is positioned directly in front of the plasma jet 9. There is no power variation over time. Constant power.

A solid sample—for example a caffeine tablet—is positioned directly in front of the plasma jet 9.

The power can be selected at a constant at 1 to 30 W argon gas at 1000 sccm (or with other noble gases).

For example, a commercially available caffeine tablet, 50 mg, as sample 10, is brought into direct contact with the argon plasma jet 9. For example, the mass spectrometer 11 shows the following peaks for [M+H]$^+$ at 195.08 m/z and for [M$^+$] at 194.08 m/z.

(2) In an alternative approach, a solid sample 10, for example, in the manner of a mixture of propyphenazone, caffeine, paracetamol, is positioned directly in front of the Plasmajet 9, e.g., with a power constantly at 1 to 30 W, argon gas at 1000 sccm (or with other noble gases).

The commercially available tablet, 50 mg of propyphenazone, 50 mg of caffeine, 300 mg of paracetamol, is brought as a sample 10 into direct contact with the argon plasma jet 9.

The mass spectrometer 11 shows the following peaks: Caffeine: [M+H]$^+$ at 195.08 m/z and [M$^+$] at 194.08, propyphenazone [M+H]$^+$ at 231.14 m/z, and [M+] at 230.14, as well as acetaminophen [M+H]$^+$ at 151.063 and [M$^+$] at 150.063.

(3) A drop of a liquid sample 10 (a caffeine solution, 1 ppm, methanol solvent) is placed on a slide directly in front of the plasma jet 9, for example, with a power constantly at 1 to 30 W, argon gas at 1000 sccm (or other noble gases).

The liquid sample 10, concentration 1 ppm, is brought into direct contact with the argon plasma jet 9. The mass spectrometer 11 shows the following peaks: [M+H]$^+$ at 195.08 m/z, and [M$^+$] at 194.08 m/z.

(4) One drop, 1 ml, of a liquid sample 10 (1 ppm, in methanol), a mixture of propyphenazone, caffeine, paracetamol, is positioned directly in front of the plasma jet 9; the power can be selected to be constant at 1 to 30 W with argon gas at 1000 sccm (or other noble gases).

The liquid sample 1 ml, 1 ppm propyphenazone, caffeine, paracetamol in MeOH (methyl alcohol) is brought into direct contact with the argon plasma jet 9. The mass spectrometer 11 shows the following peaks: Caffeine: [M+H]$^+$ at 195.08 m/z and [M$^+$] at 194.08, propyphenazone [M+H]$^+$ at 231.14 m/z, and [M$^+$] at 230.14 m/z, acetaminophen [M+H]$^+$ at 151.063 m/z and [M$^+$] at 150.063 m/z.

(5) Tetrabutyltin, which is gaseous under standard conditions, is brought directly from its container in front of the plasma jet 9. The measurement can be performed under the same power conditions as shown under example (1). The mass spectrometer 11 shows the following peaks: 348.1838 m/z for [M$^+$] and 349.1838 m/z for [M+H].

(6) Feeding a solid alloy at 300 watts power, 1000 sccm argon (other noble gases or air), plasma gas temperature about 6000° C., LTE argon plasma.

(7) The tip of a copper wire (Cu, an element), diameter 2 mm (purity 99.999), is brought into contact with the hot argon plasma jet 9 directly in front of the plasma jet 9. The copper wire vaporizes, atomizes, and the atoms that are in the gas phase ionize. The mass spectrometer 11 shows a peak for Cu$^+$ at 62.929 m/z with 69.17% corresponding to the natural frequency of $^{63}$Cu.

(8) The tip of a gold wire (Au, an element), diameter 2 mm (purity 99.999), is brought into contact with the hot argon plasma jet 9 directly in front of the plasma jet 9. The gold wire vaporizes and atomizes, and the gold atoms that are in the gas phase ionize. The mass spectrometer shows a peak for Au$^+$ at 196.97 m/z with 100% corresponding to the natural frequency.

(9) The tip of a tungsten-rhenium wire, an alloy, 2 mm diameter (purity 99.999), is brought into contact with the hot argon plasma jet 9 directly in front of the plasma jet 9. The tungsten-rhenium wire vaporizes, atomizes, and the tungsten and rhenium atoms that are in the gas phase ionize. The mass spectrometer 11 shows a peak for W$^+$ at 183.95 m/z and for Re$^+$ at 186.95 m/z.

(II) EXAMPLES WITH INTRODUCTION OF THE SAMPLE INTO THE PLASMA LET AT CONSTANT POWER

Solid, liquid, gaseous samples can be treated with cold non-LTE plasma up to maximally 300° C. plasma gas temperature for molecules, and with hot LTE plasma with a plasma temperature up to about 6500° C. argon plasma for elements. The sample 10 or the sample material 10' is introduced by means of the sample feed 130, i.e., through the cannula jet 126, as shown in connection with FIGS. 5 and 9.

(1) The solid sample 10, for example, a caffeine tablet which has been ground to a fine powder and is present in powder form, is guided by means of a carrier gas, for example, argon at 1000 sccm argon (alternatively other gases) through the cannula jet 126 by means of the sample feed 130, and brought into contact with the plasma at the end of the cannula (coated or uncoated). The power can be constant at 1 to 30 watts, preferably 20 W. As a carrier gas, argon at 1000 sccm (or other noble gases) can be used. The mass spectrometer 11 shows the following peaks for caffeine [M+H]$^+$ at 195.08 m/z and for [M$^+$] at 194.08 m/z.

(2) The solid sample, a mixture of propyphenazone, caffeine, paracetamol in powder form, is guided through the inner conductor 125 (coated or uncoated), i.e., through the sample feed 130, of the cannula jet 126, by means of a carrier gas, for example, argon at 1000 sccm, or by other gases, and at the end brought into contact with the plasma jet 9. The power can be constant at 1 to 30 watts, preferably 15 W; argon gas at 1000 sccm (or other noble gases) can be used for the plasma. The mass spectrometer 11 shows the peaks for caffeine, namely for [M+H]$^+$ at 195.08 m/z and for [M$^+$] at 194.08 m/z, for propyphenazone for [M+H]$^+$ at 231.14 m/z and for [M$^+$] at 230.14 m/z, and for acetaminophen for [M+H]$^+$ at 151.063 and for [M$^+$] at 150.063 m/z.

(3) Tetrabutyltin, which is gaseous under normal conditions, is taken directly from its container and guided through the inner conductor 125 (coated or uncoated) and in particular the sample feed 130 of the cannula jet 126 by means of a carrier gas, for example, argon at 1000 sccm argon, or other gases, and at the end brought into contact with the plasma jet 9. The power can be constant at 1 to 30 W and preferably at 15 W, wherein argon gas at 1000 sccm (or other noble gases) is used for the plasma. Under the same power conditions as described under (1), the mass spectrometer shows the following peaks 348.1838 m/z for [M$^+$] and 349.1838 m/z for [M+H].

(4) The generator power can be 30 to 1000 W, and preferably 310 W. Plasma gas temperature: 6500° C. Auxiliary gas 100 sccm-5000 sccm argon, preferably 1500 sccm. The tip of a copper wire (Cu, an element), diameter 0.1 mm to 5 mm, preferably 1 mm, (purity 99.999) is introduced through the inner conductor 125 (coated or uncoated) and in particular the sample feed 130 of the cannula jet 126 into the plasma 9 which is located at the end of the cannula jet 126 in the area 124, 125a. The copper wire vaporizes and atomizes, and the atoms that are in the gas phase ionize. The mass spectrometer 11 shows a peak for Cu$^+$ at 62.929 m/z with 69.17% corresponding to the natural frequency of $^{63}$Cu.

(III) EXAMPLES OF DIRECT (IN FRONT OF THE PLASMA JET) AND INDIRECT (VIA THE CANNULA JET) PLASMA TREATMENT OF THE SAMPLE AT VARIABLE POWER OVER TIME (1) This embodiment in particular describes the direct positioning of a sample 10, for example, in the form of an aqueous solution of copper ions and caffeine, in front of the plasma jet 9.

An acidic, pH<7, liquid sample, which is composed of the following components, is treated directly with the plasma jet 9. The liquid sample 10 is a solution of copper ions and caffeine in a concentration of 1 ppm. The sample 10 is positioned on a slide in front of the plasma jet 9 and a low power, preferably 15 W, is applied. A spectrum is generated, which is shown in FIG. 6. Then the power is increased to 300 W. As a result, the copper ions desorb, atomize, and ionize in the applied solution. A mass spectrum, as shown in FIG. 7, is generated. The continuous increase of the power from 15 W to 300 W can be solved by means of a processing unit and a software for different power programs. For this purpose, the following power parameters are possible, which are shown in FIGS. 2 and 3. Alternatively, charged protonated caffeine ions or simply charged copper ions can be generated. This has the advantage that with this method, it is possible to detect both small, e.g., organic molecules (m/Z up to 5000), such as caffeine, and metals, such as copper, which can otherwise only be detected by means of ICP-MS or ICP-OES.

(2) This embodiment describes particularly the introduction of a liquid sample 10, for example, an aqueous solution of copper ions and caffeine, into the plasma 9 via the cannula jet, which is conceived as the sample feed 130.

An acidic, pH<7, liquid sample, which is composed of the following components, is introduced into the cannula jet. The liquid sample 10 is a solution of copper ions and caffeine in a concentration of 1 ppm. By means of a peristaltic pump and a flow rate of preferably 1 ml per minute, the sample 10 is pumped through the coated or uncoated inner conductor of the cannula jet conceived as a sample feed 130, and low power is applied, preferably 15 W. A spectrum is generated, which is shown in FIG. 6. Then the power is increased to 300 W. As a result, the copper ions that transition to the gas phase atomize and ionize. A mass spectrum, as shown in FIG. 7, is generated. The continuous increase of the power from 15 W to 300 W can be solved by means of a processing unit and a software for different power programs. For this purpose, the following power parameters are possible, which are shown in FIGS. 2 and 3. Alternately, charged protonated caffeine ions or simply charged copper ions can be generated. This has the advantage that with this method, it is possible to detect both small molecules (m/Z up to 5000), such as caffeine, and metals, such as copper, which can otherwise only be detected by means of ICP-MS or ICP-OES.

(3) This embodiment describes particularly the introduction of a sample 10, for example, in the form of an aerosol of copper ions and caffeine, into the plasma 9 via the cannula jet, which is conceived as the sample feed 130.

An acidic, pH<7, liquid sample, which is composed of the following components is introduced as an aerosol into the cannula jet. The liquid sample is a solution of copper ions and caffeine in a concentration of 1 ppm. The aerosol is generated with a commercially available ICP-MS or ICP-OES nebulizer and pumped at an aerosol flow rate from 50 ml/min to 1000 ml/min, preferably 50 ml per minute, through the coated or uncoated inner conductor of the cannula jet, and low power is applied, preferably 15 W. A spectrum is generated, which is shown in FIG. 6. Then the power is increased to 300 W. As a result, the copper ions that transition to the gas phase atomize and ionize. A mass spectrum, as shown in FIG. 7, is generated. The continuous increase of the power from 15 W to 300 W can be solved by means of a processing unit and a software for different power programs. For this purpose, the following power parameters are possible, which are shown in FIGS. 2 and 3. Alternatively, charged protonated caffeine ions or simply charged copper ions can be generated. The resulting advantage is the ability to use this method to detect both small molecules (m/Z up to 5000), such as caffeine, and metals, such as copper, which can otherwise only be detected by means of ICP-MS or ICP-OES.

(4) This embodiment describes particularly the introduction of a solid sample in front of the plasma jet 9, for example, in the form of a powder mixture consisting, for example, of copper(II) nitrate and a caffeine tablet.

A powdery solid sample, which is composed of the following components, is treated directly with the plasma jet. The powdery solid sample consists of 1 mg copper(II) nitrate and 1 mg pure caffeine. The mixed powdery sample is positioned on a slide in front of the plasma jet, and low power is applied, preferably 15 W. A spectrum is generated, which is shown in FIG. 6. Then the power is increased to 300 W. As a result, the copper ions, which desorb in the applied solution, transition to a gas phase, atomize and ionize. A mass spectrum, as shown in FIG. 7, is generated. The continuous increase of the power from 15 W to 300 W can be solved by means of a processing unit and a software for different power programs. For this purpose, the following power parameters, which are shown in FIGS. 2 and 3, are possible. Alternately, charged protonated caffeine ions or simply charged copper ions can be generated. This has the advantage that with this method, it is possible to detect both small molecules (m/Z up to 5000), such as caffeine, and metals, such as copper, which can otherwise only be detected by means of ICP-MS or ICP-OES.

(5) This embodiment describes particularly the introduction of a solid sample 10 via the cannula jet, for example, in the form of a powder mixture consisting, for example, of copper(II) nitrate and a caffeine tablet, wherein the sample 10 is blown through the inner conductor.

A powdery solid sample, which is composed of the following components, is introduced via the sample inlet 127a of the cannula jet, which is conceived as a sample feed 130, by means of argon at a flow rate of 2000 sccm. In particular, the introduction can be effected by blowing the sample through the inner conductor of the cannula jet, i.e., particularly the sample feed 130. The powdery solid sample consists of 1 mg copper(II) nitrate and 1 mg pure caffeine. A low power, preferably 15 W, is applied to the mixed powdery sample. A spectrum is generated, which is shown in FIG. 6. Then the power is increased to 300 W. As a result, the copper ions, which desorb in the applied solution, transition to a gas phase, atomize and ionize. A mass spectrum, as shown in FIG. 7, is generated. The continuous increase of the power from 15 W to 300 W can be solved by means of a processing unit and a software for different power programs. For this purpose, the following power parameters, which are shown in FIGS. 2 and 3, are possible. Alternately, charged protonated caffeine ions or simply charged copper ions can be generated. This has the advantage that with this method, it is possible to detect both small molecules (m/Z up to 5000), such as caffeine, and metals, such as copper, which can otherwise only be detected by means of ICP-MS or ICP-OES.

(6) In this embodiment, for example, biological samples 10 with protein incubated with rare earths are described.

A tissue labelled with rare earths (lanthanum, etc.) is positioned on a slide in front of the plasma jet. At a low power of, for example, 1 W to 20 W, phospholipids can be observed in the mass spectrum; at a high power (350 W), the tissue pyrolyzes and the previously labeled lanthanum transitions to the gas phase, atomizes and ionizes. A typical mass spectrum for the lanthanides, as can also be seen with laser ablation ICP-MS, is generated. The power can be generated manually or by a software (processing unit on the solid-state generator).

(IV) FURTHER EXAMPLES

In the method described in the claims, both negative and positive ions are typically generated by the high-frequency field, when the analyte is brought into contact with a species in an excited state. Some analytes are electron-affine and tend to capture or absorb electrons to create negatively charged analyte ions $[M]^-$ or $[M-H]^-$ which allow for a detection and identification of these analytes.

Others have a greater affinity for protons or positive ions and can be ionized, for example, by absorbing protons or protonated species $[M+H]^+$. This can be used to lead an instrument or device into a mode for positive or negative ions. One example is picric acid which can be detected with the described method as a negatively charged molecular ion or molecular ion adduct $[M-H]^-$, $[M-OH]^-$ by a mass spectrometer in the negative mode.

Various embodiments in connection with the present invention comprise the generation of a plasma. In this context, a plasma refers to a mixture of particles (plasma species) which are capable of flowing in the manner of a gas, but with an electromagnetic field change, it can thus effect this mixture to have a significant portion of charge carriers, namely plasma electrons and plasma ions.

The plasma PCs comprise plasma electrons, plasma ions, metastable PCs, for example, atoms or molecules that are electronically or vibronically excited (i.e., have an excited vibrational state) but are not yet ionized.

For the sake of simplicity, the term "plasma" is supposed to also comprise the term of a neutral gas, neutral gas atoms, and/or neutral gas molecules, which generally occupy the same space as charged or excited plasma species, but have not yet been applied with energy or ionized, or have returned to a neutral basic state, for example, by a recombination or by becoming unexcited from an excited state.

In other words, the term plasma refers to a mixture of plasma species and neutral gas species. The term plasma can also comprise specific free radicals, molecular fragments, and monomers. Specific additives, for example, dopants, doping agents, or reagents can also be included for various purposes, for example, for improving the chemical sample desorption or ionization. Such additives can be premixed, namely with a plasma precursor gas, which is also called a plasma-forming gas. Furthermore, such additives can also be introduced locally into the plasma, for example, by means of an additional feed device of the cannula jet, especially via the coated or uncoated inner conductor or via the additional cooling or process gas.

In the context of the present invention, plasma ions refer to ions which are generated by forming and subsequent retaining of a plasma from a plasma precursor gas. Plasma ions are thus a PC in the plasma as such. As such, plasma ions differ from analyte ions or sample ions, which are ions formed from the sample material 10', i.e., from sample atoms or sample molecules, through the interaction between the sample material 10' and one or more plasma species. Accordingly, analyte ions are the ions that are the focus of a given analytical process, as opposed to the plasma ions.

Various embodiments in the context of the present invention are associated with the use of a plasma for ionizing a sample material 10', i.e., for generating analyte ions from the sample material 10'. This process can also be understood as a plasma-induced or plasma-based ionization.

Depending on the respective embodiment, the plasma-induced ionization can include one or more ionization mechanisms. Furthermore, depending on the respective embodiment, one or more ionization mechanisms can occur simultaneously, even though one specific ionization mechanism can be a predominant ionization mechanism. In general, plasma-induced ionization occurs, when a plasma species interacts with a neutral analyte atom or analyte molecule such that the analyte atom or analyte molecule loses an electron or captures an electron or a proton.

One example is the so-called impact ionization, in which a collision takes place between a high-energy plasma species and an analyte atom or an analyte molecule, and so the analyte atom or the analyte molecule loses an electron.

A specific embodiment is the so-called Penning ionization, in which a collision between a metastable species and an analyte atom or an analyte molecule causes the analyte atom or analyte molecule to lose an electron.

Another example is the so-called photoionization (PI), in which an interaction between a plasma photon, typically in the ultraviolet range, especially in the range of the vacuum UV, and a neutral analyte atom or molecule causes the analyte atom or analyte molecule to lose an electron or absorb an electron or proton.

In many embodiments, a plasma-induced analyte ionization process is exclusively or predominantly caused by soft ionization and achieves a high yield of molecular ions and higher-mass diagnostic ions.

In the broadest sense of the present invention, a specific limitation with regard to the composition of the plasma precursor gas for generating a plasma is initially irrelevant. Examples include ambient air, helium, molecular hydrogen, molecular nitrogen, argon, neon, other noble gases, and mixtures of the aforementioned species. However, this list is not restrictive; in fact, other species can also be used. In many applications, the plasma used is a chemically nonreactive plasma, such as can be generated by, for example, applying energy and/or by exciting argon and other monoatomic noble gases or inert gases. A non-reactive plasma can ionize other molecules or sputtering materials. However, they themselves are not consumed in chemical reactions.

In other embodiments, the plasma can include reactive species.

In embodiments with photoionization as the predominant process, it can be desirable to select a plasma precursor gas that excludes air, and so UV photons are not absorbed by oxygen species. In many embodiments, the generated plasma is a non-thermal plasma (non-local thermodynamic equilibrium), also referred to as non-equilibrium plasma or cold plasma, in which the plasma electron temperature lies well above the temperature of the plasma ions and the neutral species.

However, aspects of the present invention in the broadest sense also comprise thermal plasmas (local thermodynamic equilibrium), in which plasma electrons, plasma ions, and neutral species are present in a thermal equilibrium.

In some embodiments, the plasma can be actively generated and maintained in the same area as that of the sample material 10 that is to be ionized or excited. This area can be referred to as sample ionization area, sample excitation area, or sample interaction area.

In other embodiments of the present invention, the plasma can be actively generated and maintained in an area (plasma generation area) which is located at a (typically short) distance from the sample ionization area.

In this context, the term microwave energy can also be used, which is to be understood as electromagnetic energy in a range of the radio frequency spectrum (RF), namely from the ultra-high frequency range (UHF) to the extreme ultra-high frequency range (EHF), or in the range of 200 MHz to 5 GHz.

Various embodiments related to the present invention can also be effective outside of RF frequencies or RF wavelengths in the range of the aforementioned microwave range. In this context, the term microwave or MW can be understood as a synonym for the term radio frequency or RF.

In the context of the present invention, the sample material 10' can also be ionized by interaction with an afterglow of a plasma, in which the predominant plasma species are metastable species or photons or both metastable species and photons, as opposed to plasma ions and plasma electrons.

For the sake of simplicity, and unless otherwise stated, the term plasma is supposed to also denote an electrically active or energized plasma, as well as an afterglow plasma (i.e., a plasma after the ionization source has been switched off) and a partially extinguished plasma.

A plasma-based ion source used according to the invention can have a plasma generator as a plasma source, which is set up to produce a corresponding plasma. Furthermore, an interface is provided, which is set up to supply analyte ions or analyte photons, namely photons which are emitted by analyte atoms or analyte ions, to an analytical measuring device, for example, a spectrometer 11.

The ion source is designed to analytically desorb species from a sample 10, and so the analyte is entrained effectively as a flag in a space above the surface of the sample 10. The ion source is further designed to form a spatially localized interaction, i.e., an interaction area or an ionization area, particularly precisely above the sample surface, where the analyte interacts with the plasma to form analyte ions and analyte photons.

The ion source can be realized by means of various embodiments. Depending on the respective embodiment, the plasma can be generated in an ionization area or can be fed over a short distance to an ionization area.

TABLE 1

Comparison of the detection limits between invention and conventional method

| Element | Detection limit (µg/l) invention | Detection limit (µg/l) (conventional method) |
|---|---|---|
| Aluminum | 0.1 | 12 |
| Arsenic | 80 | 840 |
| Cadmium | 2.5 | 24 |
| Copper | 0.3 | 2.3 |
| Manganese | 1.2 | 12 |
| Molybdenum | 0.7 | 180 |
| Lead | 2.1 | 80 |
| Selenium | 89 | 430 |
| Zinc | 1.4 | 50 |

In various embodiments of the present invention, a microwave power of 52 W can be used, for example, also in connection with a gas flow rate of 2 l/minute and a gas flow rate for the sample gas of 1 l/minute.

Compared to the conventional approach, it was possible in this context to improve the detection limit by a factor of at least 10, as is shown in Table 1 above, and to simultaneously reduce the process gas to 2 liters. Compared to ICP-MS or ICP-OES, the flow rate is 20 liters.

Deviating from and in addition to the depictions of FIGS. 2 and 3, which describe the variation of the power P as a function of time, the power P can be temporally varied periodically or periodically in the time in the manner of a multi-stage step function.

In connection with the cannula jet shown in FIGS. 5 and 9 in the sense of the sample feed 130, a so-called nebulizer can also be coupled in the input area 127a for introducing the sample material 10', for example, for introducing an aerosol into the coated sample feed 130, conceived as a cannula jet.

The invention claimed is:

1. A method for the spectrometry of a sample (10), comprising the following steps:
   providing a solid-state generator (2) for generating a high-frequency signal, having a control element for varying a power and/or a frequency of the signal,
   providing a plasma ignition head (6) fed by the signal for generating a plasma jet (9), applying the plasma jet (9) to the sample (10),
   performing a first measuring operation (12) on the sample (10), wherein the plasma jet (9) is generated with a first power of the solid-state generator (2), a spectrum emitted by the sample (10) is recorded by means of a spectrometer (11), and
   the first power is adjusted on the solid-state generator (2) such that the application of the plasma jet (9) to the sample (10) leads to a desorption and ionization of molecules present in the sample (10) into molecular ions, quasi-molecular ions, molecule adducts and/or fragments, and/or
   performing a second measuring operation (13) on the same sample (10),
   wherein the plasma jet (9) is generated with a second power of the solid-state generator (2) which is higher than the first power,
   a spectrum emitted by the sample (10) is recorded by means of the spectrometer (11), and the second power is adjusted on the solid-state generator (2) such that the application of the plasma jet (9) to the sample (10) leads to an atomization of chemical elements of the periodic table of the elements present in the sample (10) and to their ionization and to singly as well as multiply charged ions, wherein at least two different plasma ignition heads are provided and prior to the application of the plasma jet (9) to the sample (10), one of the different plasma ignition heads (6) is connected to the solid-state generator (2) in an electrically conductive manner.

2. The method according to claim 1, wherein, for applying the plasma jet (9), the sample (10) is arranged externally to the electrically connected plasma ignition head (6) and coated directly with the plasma jet (9).

3. The method according to claim 1, wherein, for applying the plasma jet (9) to the sample (10), sample material (10'), which underlies the sample (10), is gathered, externally to the electrically connected plasma ignition head (6), by means of a sample feed (123, 125, 107 20) via a sample holder (127a) of the sample feed (123, 125, 127) and released via a sample dispenser (125a) of the sample feed (123, 124, 127) into the plasma jet (9) originating from a plasma area (114, 124) of the plasma ignition head (6).

4. The method according to claim 3, wherein, as the sample feed (123, 125, 127), a tubular element is used which has an inner wall comprising or made of a material which is resistant to acids, bases and/or elevated temperatures is chemically inert and/or which comprises metals, alloys, glass, quartz, ceramic, metallic non-conductors, high-performance polymers and/or borosilicate material.

5. The method according to claim 3, wherein the sample material (10') underlying the sample (10) is fed directly or indirectly via a gaseous and/or liquid carrier material through the sample feed (123, 125, 127) to the plasma area (114, 124) of the electrically connected plasma ignition head (6), wherein the sample material (10') contains one or more solid, liquid and/or gaseous components.

6. The method according to claim 1, wherein the first power lies between 1 W and 70 W.

7. The method according to claim 1, wherein the second power lies between 30 W and 500 W.

8. The method according to claim 1, wherein the two measuring operations are performed alternately, a plurality of times in succession.

9. The method according to claim 4, wherein the power is set back and forth alternately and in a pulsed manner between the first power and the second power.

10. The method according to claim 4, wherein the power is alternately increased continuously from the first power to the second power and/or is continuously lowered again to the first power.

11. The method according to claim 1, wherein, during the execution of the method, the sample is arranged outside of the spectrometer (11).

12. The method according to claim 1, wherein the high-frequency signal has a frequency between 200 MHz and 10 GHz.

13. The method according to claim 1, wherein the first measuring operation (12) is followed immediately by the second measuring operation (13).

14. The method according to claim 1, wherein, after the first measuring operation (12), the power is increased gradually and/or continuously.

15. The method according to claim 1, wherein, after the first measuring operation (12), the power is first reduced and then increased to the second power.

16. The method according to claim 1, wherein the plasma jet (9) of a different power is applied to the sample (10) even between the two measuring operations (12, 13), and a spectrum emitted by the sample (10) is recorded with the spectrometer (11).

17. The method according to claim 1, wherein there is an increase to the second power as soon as the soft ionization of the molecules is detected on the spectrometer (11).

* * * * *